United States Patent [19]

Matsuda et al.

[11] 4,350,670

[45] Sep. 21, 1982

[54] PROCESS FOR TREATING FLUE GAS

[75] Inventors: Shimpei Matsuda, Ibaraki; Akira Kato, Hitachi; Toshikatsu Mori, Hitachi; Teruo Kumagai, Hitachi; Yukio Hishinuma, Hitachi; Hidetoshi Akimoto, Ibaraki; Fumito Nakajima, Hitachi, all of Japan

[73] Assignees: Hitachi, Ltd.; Babcock-Hitachi Kabushiki Kaisha, both of Tokyo, Japan

[21] Appl. No.: 179,238

[22] Filed: Aug. 18, 1980

[30] Foreign Application Priority Data

Aug. 20, 1979 [JP] Japan .............................. 54-105032
Aug. 20, 1979 [JP] Japan .............................. 54-105033

[51] Int. Cl.³ .......................... B01J 8/00; C01B 17/00
[52] U.S. Cl. .................................. 423/244; 423/239
[58] Field of Search .......... 423/242 A, 242 R, 244 A, 423/244 R, 533, 536, 239 A; 252/472

[56] References Cited

U.S. PATENT DOCUMENTS 3,579,569  5/1971  Montgomery et al. .............. 252/472
4,187,282  2/1980  Matsuda et al. ................ 423/244 R

FOREIGN PATENT DOCUMENTS 2150687   4/1973  Fed. Rep. of Germany ... 423/244 A
51-146368 12/1976 Japan.
5079    of 1913  United Kingdom ................ 423/533

OTHER PUBLICATIONS

Chemical Engineering Progress, vol. 71, No. 5, May 1975 pp. 66–71.

*Primary Examiner*—O. R. Vertiz
*Assistant Examiner*—Gregory A. Heller
*Attorney, Agent, or Firm*—Thomas E. Beall, Jr.

[57] ABSTRACT

A coal or petroleum combustion flue gas containing sulfur oxides and dust is treated by contacting the flue gas with a sulfur dioxide-oxidizing catalyst, thereby converting sulfur dioxide to sulfur trioxide, allowing the resulting sulfur trioxide to react with components of dust, absorbing the trioxide into the dust as a sulfate, and removing the dust. Catalytic oxidation of sulfur dioxide can be efficiently carried out at a low temperature and sulfur oxides can be efficiently removed from the flue gas.

7 Claims, 2 Drawing Figures

PROCESS FOR TREATING FLUE GAS

BACKGROUND OF THE INVENTION

The present invention relates to a process for treating a flue gas, and more particularly to a process for removing dust and sulfur oxides from a gas containing dust and sulfur oxides, which may be hereinafter referred to merely as "$SO_x$", such as coal combustion flue gas, etc.

Flue gas from combustion of coal, petroleum, etc. usually contains a few 100 to a few 1,000 ppm of $SO_x$. Since $SO_x$ is an air pollutant, various processes for abating discharge of $SO_x$ to the surrounding atmosphere have been developed and practically used. Typical processes for treating $SO_x$ include a limestone-gypsum process comprising absorbing $SO_x$ in calcium carbonate slurry, oxidizing the slurry, thereby converting the slurry to gypsum, and recovering the gypsum, a process of absorbing $SO_x$ in an aqueous alkaline solution of caustic soda, caustic potash, etc., a process of using an adsorbent such as activated carbon, copper oxide, etc., as disclosed in Chem. Eng. Progress Vol. 51, No. 5, May (1975) pages 66-71. Among these processes, the limestone-gypsum process is most widely used for treating a large volume of a flue gas such as boiler flue gas of power plants. However, the limestone-gypsum process and the process of using an aqueous solution of caustic soda, caustic potash, etc. require waste liquor treatment, and the process of using an adsorbent requires regeneration of the adsorbent after the adsorption of $SO_x$. In addition to these problems, the limestone-gypsum process requires heating of flue gas after the removal of $SO_x$, because the temperature of the flue gas is lowered at the removal of $SO_x$, and the process of using the aqueous solution of caustic soda, caustic potash, etc. requires a large amount of the reagent.

SUMMARY OF THE INVENTION

An object of the present invention is to provide a process for removing $SO_x$ without the disadvantages of the prior art.

Another object of the present invention is to provide a process for treating a flue gas by a sulfur dioxide-oxidizing catalyst.

A further object of the present invention is to provide a process for removing $SO_x$ and nitrogen oxides from a flue gas containing $SO_x$ and nitrogen oxides.

The present process essentially comprises contacting a flue gas containing $SO_x$ and dust with a sulfur dioxide-oxidizing catalyst, thereby converting sulfur dioxide to sulfur trioxide, allowing the sulfur trioxide to react with components of dust, thereby absorbing the sulfur trioxide into the dust as a sulfate, and then removing the dust.

The components of dust, which react with sulfur trioxide to form a sulfate include metal oxides such as alkali metal oxides, alkaline earth metal oxides, aluminum oxide, iron oxide, etc. Thus, it is desirable that the dust contains these metal oxides.

$SO_x$ contained in a coal or petroleum-fired boiler flue gas is mostly sulfur dioxide, which may be hereinafter referred to merely as "$SO_2$", and 0.5-5% by volume of $SO_x$ is sulfur trioxide which may be hereinafter referred to merely as "$SO_3$". $SO_2$ can be adsorbed or absorbed in porous material having a large surface area, such as copper oxide, iron oxide, activated carbon, etc. Generally, $SO_2$ is less reactive with a metal oxide than $SO_3$. The present invention is based on the finding that $SO_3$ is more reactive with a metal oxide and can be easily fixed as a sulfate.

Dust composition of coal combustion flue gas depends upon the kind of coal used, but the coal combustion flue gas contains about 1 to several tens of grams/$Nm^3$ of dust, and the dust usually contains metal oxides such as $SiO_2$, $Al_2O_3$, $Fe_2O_3$, $MgO$, $TiO_2$, $Na_2O$, $K_2O$, $CaO$, etc. Thus, the dust has a capacity for absorbing or adsorbing $SO_x$ in a flue gas.

Oxidation of $SO_2$ to $SO_3$ is carried out at a temperature of 250° to 500° C., and the temperature depends upon the activity of a catalyst. The catalyst for oxidation of $SO_2$ to $SO_3$ includes catalysts of vanadium group and platinum group as used in the process for producing sulfuric acid. Chrominum, copper, etc. can be used as the catalyst, because they have the $SO_2$ oxidation activity. A catalyst comprising titanium oxide as the main component and containing a platinum group, particularly 0.01-5.0% by weight of platinum on the basis of total amount of catalyst has also a high activity and thus is suitable for the present invention.

Applicable types of catalytic reactor for the oxidation of $SO_2$ to $SO_3$ include a fixed bed type reactor with granular, cylindrical or round columnar rod catalyst or honeycomb catalyst of parallel flow type, or plate (monolithic) catalyst, a moving bed-type reactor with granular catalyst, etc. A reactor of parallel flow type with a monolithic type catalyst is particularly suitable for treating a gas of high dust content. Preferable space velocity for oxidation of $SO_2$ to $SO_3$ (gas flow volume in unit time and unit catalyst bed volume) is 200 to 100,000 $hr^{-1}$. If the space velocity is less than 200 $hr^{-1}$, the catalyst must be used in a large amount, which is not economical, whereas, if the space velocity is more than 100,000 $hr^{-1}$, $SO_2$ conversion is not increased.

As a result of extensive studies, the present inventors have found that a catalyst comprising a platinum group element and titanium dioxide, the content of titanium dioxide being at least about 70% by weight on the basis of total amount of catalyst is most suitable as an $SO_2$-oxidizing catalyst. As the platinum group element for the catalyst, any of ruthenium, rhodium, palladium, osmium, iridium and platinum can be used, but commercially preferable are platinum, rhodium, ruthenium and palladium. These elements can be used alone or in combination. The content of the platinum group element is about 0.01 to about 2% by weight, preferably about 0.1 to about 1% by weight, on the basis of total amount of catalyst. If the content of platinum group element is less than about 0.01% by weight, the $SO_2$ oxidation activity is not satisfactory, whereas even if it is more than about 2% by weight, the oxidation activity is not enhanced. This is not advantageous from the economical viewpoint.

In addition to the platinum group element, or as part thereof, a promoter component can be used. As the promoter component, it is effective to add transition metal elements such as vanadium, chromium, manganese, iron, cobalt, nickel, copper, molybdenum, tungsten, tin and silver, or alkali metal elements such as potassium, sodium, etc. in the forms of compounds such as oxides, sulfates, sulfide, etc. to the catalyst. In that case, it is preferable to add 0.01 to 30% by weight of the promoter component in the terms of element on the basis of the platinum group element.

Description will be made of another catalyst component, titanium dioxide. It is necessary that the catalyst contain at least about 70% by weight of titanium oxide on the basis of total amount of catalyst. That is, titanium oxide can be used in mixture with a carrier material such as diatomaceous earth, silica, pumice, zeolite, etc., but it is desirable from the view-point of utilizing pore structure of titanium dioxide that the catalyst contain at least about 70% by weight of titanium dioxide. Furthermore, it has been found that titanium dioxide is hardly sulfatized by sulfur oxides, the pore structure of the catalyst is less changed, and the activity is less lowered by sulfur compounds. The titanium dioxide may be used as a carrier. In the case of titanium dioxide, it is necessary that the specific surface area of titanium dioxide is at least 1 m$^2$/g, preferably at least 10 m$^2$/g. That is, it is necessary to adjust conditions for preparing a catalyst to obtain such specific surface area.

The raw material for titanium dioxide includes, in addition to titanium dioxide powder, orthotitanic acid and metatitanic acid which can be converted to titanium dioxide by thermal decomposition at least at about 150° C., hydrous titanium oxides obtained by hydrolysis of titanium sulfate, titanium tetrachloride, etc., and organotitanium compounds such as titanium isopropoxide, etc. However, titanium dioxide undergoes sintering at a temperature of 800° C. or higher, and thus it is necessary that a heat-treating temperature at the calcination in the process for shaping titanium dioxide carrier or at the calcination of catalyst, etc. is less than 900° C., preferably less than 800° C. to obtain a satisfactory specific surface area.

The means for shaping the carrier and the catalyst is not particularly limited, and any of the well known tabletting method, rotary pan granulation method, extrusion molding method, and spray drying method can be used. Furthermore, the shape of catalyst is not particularly limited, and any of round columnar shape, cylindrical shape, spherical shape, granular shape, honeycomb shape, etc. can be selected as desired, and the desirable shape can be determined after an overall study of flue gas properties, ease in preparing the catalyst, etc.

In order to support the platinum group element on a carrier containing titanium dioxide as the main component, a carrier pelletized in advance is dipped in an aqueous solution containing a water-soluble platinum group compound, or slurry of carrier components containing titanium dioxide as the main component is mixed with an aqueous solution of a water-soluble platinum group compound and the resulting mixture is treated according to the above-mentioned means for shaping the catalyst.

Reaction temperature for catalytic oxidation of sulfur dioxide with oxygen in the presence of the titanium dioxide-platinum group catalyst according to the present invention is 300° to 450° C., preferably 350° to 450° C. In this temperature range, the present catalyst has a considerably higher activity than other catalysts.

Preferable space velocity for the present catalyst is 1,000 hr$^{-1}$ to 50,000 hr$^{-1}$.

When the carrier is used, it is not preferable to use alumina as a carrier component. Alumina is readily sulfatized at a low temperature, and if alumina is contained as the carrier component, alumina is sulfatized by the formed sulfur trioxide, and consequently pore structure and specific surface area of the catalyst are greatly changed, lowering the activity.

The flue gas leaving the oxidation process contains most of $SO_x$ as $SO_3$, and $SO_3$ reacts with metal oxides (the above-mentioned oxides of alkali metal, alkaline earth metal, iron, aluminum, etc.) in dust (solid fine particles) contained in the flue gas to form metal sulfates. Reaction of $SO_3$ with the components of the dust proceeds even within the oxidation reactor. When there are not enough metal oxides in the dust to absorb $SO_3$, fine particles of oxides, hydroxides, carbonates, etc. of alkali metal and alkaline earth metal can be added to the flue gas from the outside. This is preferable for enhancing the percent $SO_x$ removal.

The time for the reaction of $SO_3$ with the components of dust can be about 0.1 to 10 seconds, but the time of more than 10 seconds is not objectionable. To improve the $SO_2$ conversion and $SO_3$ absorption, the $SO_2$ oxidation process can be provided at a plurality of stages, and a space can be provided between the adjacent catalyst beds. This is also a preferable means.

$SO_3$ reacts with the metal oxides in the dust and is absorbed into the dust as a sulfate. The dust can be removed according to the ordinary dust collecting means. Typical dust collecting means includes, for example, an electrostatic dust precipitator, cyclone, bag filter, etc.

The temperature for the dust removal can be a temperature usually applicable to these means, and is in a range of the normal temperature to 500° C.

Flue gas from boilers and various industrial furnances contains not only $SO_x$ but also nitrogen oxides, which may be hereinafter referred to merely as "$NO_x$". Thus, a process capable of removing not only $SO_x$ but also $NO_x$ has a higher utility. As such a process, a process for removing $NO_x$ by dry ammonia reduction and successively removing $SO_x$ is well known, for example, from Japanese Laid-open Patent Application No. 146368/76. As a process for removing $SO_x$, the aforementioned limestone-gypsum process is mainly used. According to the wet limestone-gypsum process, dry removal of $NO_x$ is carried out at 300°-350° C., followed by removal of $SO_x$ at a lower temperature, and the treated flue gas must be then reheated to vent the gas to the atmosphere. Thus, the thermal efficiency is not higher.

A dry process for removing $SO_x$ by an adsorbent such as activated carbon, etc. can be sometimes used, but is not preferable on account of considerable consumption of the adsorbent and complicated regeneration treatment of adsorbent after the adsorption of $SO_x$, as compared with the wet process of removing $SO_x$.

The present process for removing $SO_x$ can be also applied to the flue gas after removal of $NO_x$ by dry ammonia reduction, and has an effect of preventing the aforementioned disadvantages encountered when the conventional wet or dry process of removing $SO_x$ is used.

When the present process of removing $SO_x$ is applied to a flue gas, at first ammonia is added to the flue gas, and nitrogen oxides are catalytically reduced and removed in an $NO_x$ removal reactor. Then, the effluent flue gas is brought into contact with a sulfur dioxide-oxidizing catalyst to convert sulfur dioxide to sulfur trioxide, and the sulfur trioxide is allowed to react with components of dust in the flue gas to absorb the sulfur trioxide into the dust as a sulfate. Then, the dust is removed in a dust collector, etc.

As the catalyst for $NO_x$ removal reaction, the so far well known catalysts can be used, but it is preferable from the viewpoint of less poisoning by sulfur oxides to use a catalyst containing titanium dioxide as the main component. As the shape of the catalyst, any of pellet shape, spherical shape, plate shape, honeycomb shape, etc. can be used. Since the coal combustion flue gas is a dirty gas containing much dust, type of reactor is preferably a parallel flow type. Preferable reaction temperature is 250° to 500° C.

PREFERRED EMBODIMENTS OF THE INVENTION

Figure 1:
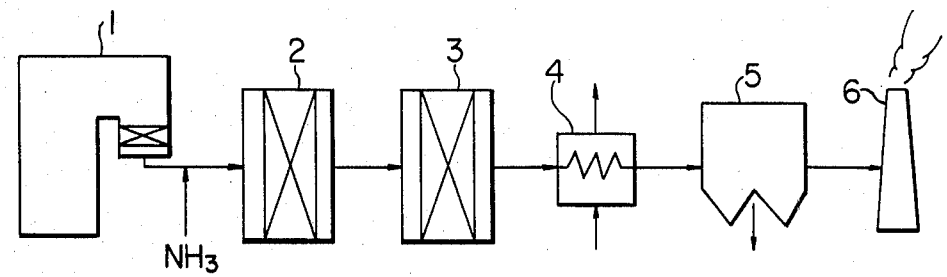
FIG. 1 is a flow diagram showing steps of removing $NO_x$ and $SO_x$ from a coal combustion flue gas according to one embodiment of the present invention.

The present process will be described, referring to FIG. 1.

A flue gas from a coal-fired boiler 1 is admixed with ammonia, and then led to an $NO_x$ removal reactor 2 filled with an $NO_x$-removing catalyst, where $NO_x$ is converted to harmless nitrogen and water according to the following reaction equation, where $NO_x$ is represented typically by NO.

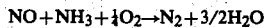

$$NO + NH_3 + \tfrac{1}{4}O_2 \rightarrow N_2 + 3/2 H_2O$$

Then, the effluent gas is led to a sulfur dioxide oxidation reactor 3 filled with a sulfur dioxide-oxidizing catalyst, where sulfur dioxide in the gas is converted to sulfur trioxide according to the following reaction equation.

$$SO_2 + \tfrac{1}{2}O_2 \rightarrow SO_3$$

The resulting sulfur trioxide is absorbed into the dust as a sulfate through reaction with components of dust. If the flue gas contains steam at that time, the sulfur trioxide is readily absorbable in the dust through the reaction.

The effluent gas from the sulfur dioxide oxidation reactor 3 is heat recovered in an air heater 4, and led to a dust collector 5, where the dust is removed from the flue gas, and at the same time, the sulfur trioxide absorbed in the dust as a sulfate is removed. The flue gas, which has been subjected to $NO_x$ removal, $SO_x$ removal, and dust removal, is vented to the atmosphere through a stack 6.

The present invention will be described in detail below, referring to Examples.

EXAMPLE 1

$SO_x$ removal was tested in a test apparatus comprising a $SO_2$ oxidation reactor, a cooler and a bag filter. Gas to be tested was prepared by adding $SO_2$ and dust (obtained from a coal-fired boiler flue gas) to a natural gas-fired boiler flue gas and had the following average composition.

$SO_2$: 3,500 ppm
$O_2$: 4% by volume
$CO_2$: 11% by volume
$H_2O$: 17% by volume
$N_2$: balance
Dust: 40 g/Nm$^3$ A cubic catalyst (length of one side: about 10 cm) of honeycomb structure (pitch: 5 mm, wall thickness: 0.7 mm) containing titanium dioxide as the main component was used for $SO_2$ oxidation. The flue gas flow rate was 2,000 Nl/hr, and the catalyst bed temperature was 350°–450° C. The flue gas leaving the oxidation reactor was cooled to 80° C. by the cooler, and the dust was removed by the bag filter. $SO_2$ content of effluent flue gas from the bag filter was measured by an infra-red analyzer to determine percent $SO_2$ removal.

The percent $SO_2$ removal was 72% at 350° C., 80% at 400° C., and 84% at 450° C. $SO_3$ was not substantially detected in the effluent gas.

EXAMPLE 2

$SO_x$ removal was carried out under the same reaction conditions as in Example 1, except that the dust from a coal-fired boiler, admixed with 10% by weight of calcium oxide on the basis of the dust was used as dust, and the dust content was controlled to be 20 g/Nm$^3$. Percent $SO_2$ removal was 97% at 350° C., 98% at 400° C., and 98% at 450° C.

EXAMPLE 3

(A) Preparation of catalyst 10 l of metatitanic acid slurry containing 35% by weight of titanium dioxide was charged into a kneader and kneaded with heating for two hours to make a water content about 35%. Then, the kneaded product was dried at 140° C. for 5 hours and pulverized in a ball mill for 2 hours. The resulting powder was calcined in air at 350° C. for 2 hours. The powder was agglomerated to spheres having diameters of 2 to 4 mm in a rotary pan granulator, and left standing for 24 hours. Then, the spheres were dried at 140° C. for 5 hours, and calcined at 350° C. for 2 hours, whereby titanium dioxide in a spherical form was obtained. Separately, 5 ml of an aqueous solution of hexachloroplatinic acid ($H_2PtCl_6$) at a concentration of 10 g Pt/100 g solution was diluted with distilled water to make total volume 35 ml, and the spherical titanium dioxide obtained in the aforementioned manner was dipped in the resulting solution. Then, the dipped spherical titanium dioxide was dried at 120° C. for 5 hours, and then calcined in a hydrogen gas stream at 450° C. for 3 hours to effect reduction. The resulting product was a titanium dioxide-platinum catalyst containing 0.5% by weight of platinum on the basis of total amount of catalyst.

(B) Catalytic oxidation of gas containing sulfur dioxide 24 ml of the catalyst prepared in the above-mentioned manner was filled in a quartz reactor tube having an inner diameter of 40 mm, and a gas having the following composition was subjected to reaction at a space velocity of 5,000 hr$^{-1}$ while varying a reaction temperature between 250° and 500° C. $SO_2$ concentration of flue gas was measured by a non-dispersing infra-red type $SO_2$ analyzer, and $SO_3$ concentration according to heated sodium chloride method.

$SO_2$: 1,000 ppm
$O_2$: 5% by volume
$H_2O$: 10% by volume
$N_2$: balance

Percent $SO_2$ oxidation is shown in Table 1.

EXAMPLE 4

(A) Preparation of catalyst 5 ml of an aqueous solution of hexachloroplatinic acid ($H_2PtCl_6$) at a concentration of 10 g Pt/100 g solution was diluted with distilled water to make total volume 70 ml, and 100 g of spherical silica carrier having diameters of 2-4 mm was dipped in the resulting solution, dried at 120° C. for 5 hours, and calcined in a hydrogen gas stream at 450° C. for 3 hours to effect reduction. The product was a silica-platinum catalyst containing 0.5% by weight of platinum on the basis of total amount of catalyst.

(B) Catalytic oxidation of gas containing sulfur dioxide

Oxidation was carried out under the same conditions as in Example 3 (B) except that the catalyst prepared in (A) was used in place of the catalyst of Example 3 (A). Results are given in Table 1.

EXAMPLE 5

(A) Preparation of catalyst 316 g of diatomaceous earth, 50 g of ammonium metavanadate, and 56 g of potassium hydroxide were kneaded with distilled water for 3 hours, and the resulting paste mixture was dried at 300° C. for 5 hours, and then pulverized in a ball mill. The resulting powder was admixed with 3% by weight of graphite, and shaped to pellets having a diameter of 3 mm and a length of 3 mm by a pelletizer. The pellets were calcined in a $SO_2$ gas stream at 450° C. for 3 hours to obtain a catalyst of $V_2O_5$-$K_2SO_4$-diatomaceous earth.

(B) Catalytic oxidation of gas containing sulfur dioxide

Oxidation was carried out under the same conditions as in Example 3 (B), except that the catalyst prepared in (A) was used in place of the catalyst of Example 3 (A). Results are shown in Table 1.

TABLE 1

| Reaction temp. (°C.) | Ex. 3 $TiO_2$—Pt | Ex. 4 $SiO_2$—Pt | Ex. 5 $V_2O_5$—$K_2SO_4$ |
|---|---|---|---|
| 250 | 35% | 20% | 18% |
| 300 | 80% | 35% | 29% |
| 350 | 95% | 60% | 54% |
| 400 | 97% | 88% | 83% |
| 450 | 99% | 96% | 95% |
| 500 | 99% | 99% | 99% |

As is evident from Table 1, sulfur dioxide can be catalytically oxidized with a higher percent oxidation at a lower temperature such as 300° to 350° C. with the titanium dioxide-platinum catalyst than with other catalysts.

EXAMPLE 6

Oxidation was carried out under the same conditions as in Example 3 except that the platinum content of the catalyst prepared in (A) was changed in a range of 0.005 to 3% by weight. Results are shown in Table 2.

TABLE 2

| Reaction temp. (°C.) | Pt content (wt. %) | | | | |
|---|---|---|---|---|---|
| | 0.005 | 0.01 | 0.1 | 2 | 3 |
| 250 | 19% | 29% | 32% | 37% | 37% |
| 300 | 45% | 75% | 77% | 81% | 80% |
| 350 | 70% | 87% | 90% | 96% | 95% |
| 400 | 80% | 90% | 92% | 99% | 98% |
| 450 | 83% | 91% | 94% | 99% | 99% |
| 500 | 84% | 92% | 95% | 99% | 99% |

As is evident from Table 2, the platinum content of 0.01% by weight was effective at 350° C., and the platinum content of 2% by weight or higher has the similar activity.

EXAMPLES 7-9

Oxidation was carried out in the same conditions as in Example 3 (B) with catalysts prepared in the same manner as in Example 3 (A) except that, in place of the aqueous solution of hexachloroplatinic acid, an aqueous solution of rhodium chloride (Example 7), an aqueous solution of ruthenium chloride (Example 8), and an aqueous solution of palladium nitrate (Example 9) were used. Results are shown in Table 3.

TABLE 3

| Reaction temp. (°C.) | Ex. 7 $TiO_2$—Rh | Ex. 8 $TiO_2$—Ru | Ex. 9 $TiO_2$—Pd |
|---|---|---|---|
| 250 | 30% | 31% | 30% |
| 300 | 70% | 72% | 71% |
| 350 | 85% | 88% | 82% |
| 400 | 90% | 92% | 88% |
| 450 | 91% | 93% | 89% |
| 500 | 91% | 93% | 90% |

EXAMPLE 10

Mixtures of titanium dioxide and silica as carriers were used to investigate relationships between the titanium dioxide content and the percent $SO_2$ oxidation.

(A) Preparation of carriers

Carriers were prepared from single silica sol, single metatitanic acid slurry containing 35% by weight of metatitanic acid in terms of titanium dioxide, and mixtures of the former two in predetermined ratios. Mixed carriers were prepared by kneading the silica sol and the metatinanic acid slurry in the predetermined ratios in a kneader with heating, then drying the kneaded mixtures for 24 hours, precalcining the dried products, pulverizing them, agglomerating the resulting powder to spheres having diameters of 2-4 mm in a rotary pan granulator, and calcining the spheres at 500° C. for 2 hours.

(B) Preparation of catalyst

The carriers thus prepared were dipped in the aqueous solution of hexachloroplatinic acid, dried and then calcined and reduced to support 0.5% by weight of platinum on the basis of total amount of catalyst in the same manner as described in Example 3(A). That is, the following 6 kinds of catalysts, namely, catalysts having compositions each of Pt-$SiO_2$ (100), Pt-$SiO_2$ (50)-$TiO_2$ (50), Pt-$SiO_2$ (40)-$TiO_2$ (60), Pt-$SiO_2$ (30)-$TiO_2$ (70), Pt-$SiO_2$ (20)-$TiO_2$ (80), and Pt-$TiO_2$ (100) were prepared, wherein the figures in parentheses are % by weight.

(C) Catalytic oxidation of gas containing sulfur dioxide

Catalytic oxidation of a gas containing sulfur dioxide was carried out with the above-mentioned 6 kinds of the catalysts in the same manner as in Example 3 (B). Reaction temperature was 300° C. Relationships between the $TiO_2$ content of the carrier and percent $SO_2$ oxidation are shown in FIG. 2.

Figure 2:
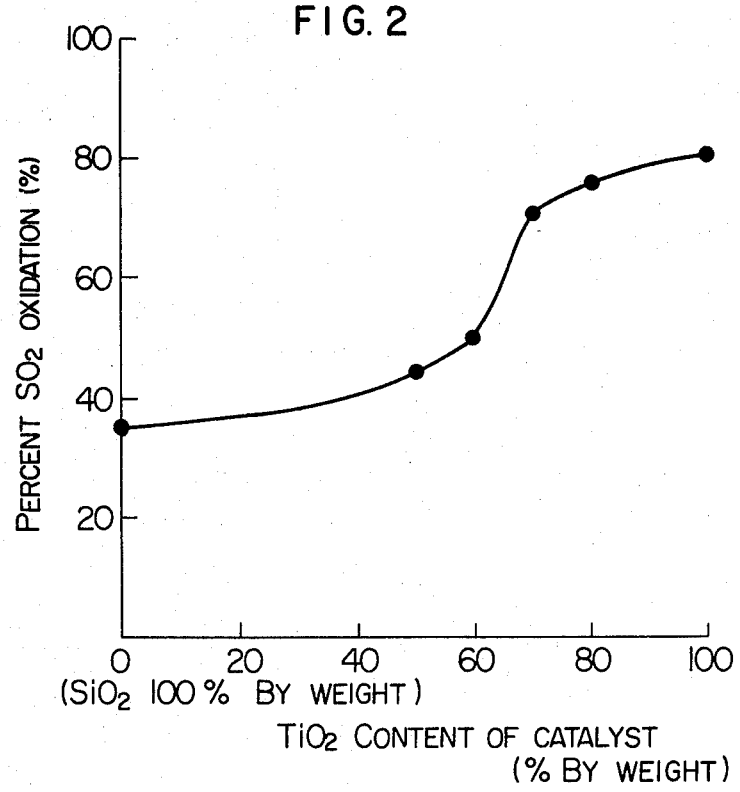
FIG. 2 is a graph showing relationships between titanium dioxide content of sulfur dioxide-oxidizing catalyst and percent $SO_2$ oxidation.

As is evident from FIG. 2, the catalysts having a $TiO_2$ content of about 70% by weight or more are effective at a relatively low temperature of 300° C., and there is a criticality at that $TiO_2$ content.

As is evident from the foregoing, the catalytic oxidation of sulfur dioxide can be efficiently carried out at such a low temperature of 300° to 350° C. with the titanium dioxide-platinum group element catalyst.

EXAMPLE 11

The present process was carried out in the apparatus for treating a coal combustion flue gas, as shown in FIG. 1.

10,000 $Nm^3/hr$ of a coal combustion flue gas having the following combustion was admixed with ammonia in a molar ratio of $NH_3/NO_x$ of 1.2:1 and led to a $NO_x$ removal reactor of parallel flow type to treat $NO_x$, where the $NO_x$-removing catalyst was a titanium dioxide-vanadium oxide catalyst of honeycomb type (Ti:V=94:6 by atom). Reaction temperature was 350° C., and space velocity was 5,000 $hr^{-1}$. Percent $NO_x$ removal was 90–93%.

Composition of coal combustion flue gas
$NO_x$: 300 ppm
$SO_x$: 1,700 ppm
$O_2$: 3% by volume
$CO_2$: 12% by volume
$H_2O$: 10% by volume
$N_2$: balance
Dust: 2 $g/Nm^3$ Then, the effluent flue gas was led to a sulfur dioxide oxidation reactor filled with a sulfur dioxide-oxidizing catalyst, which was a titanium dioxide-platinum catalyst of honeycomb type (Pt content: 0.3% by weight on the basis of total amount of catalyst). Reaction temperature was 350° C. and space velocity was 5,000 $hr^{-1}$. Percent $SO_2$ oxidation was 92–94%. The resulting sulfur trioxide reacted with components of the dust (oxides mainly of Na, K, Mg, Ca, Fe and Al) to absorb the sulfur trioxide into the dust as a sulfate. The flue gas leaving the sulfur dioxide oxidation reactor was heat exchanged in an air heater and cooled to 170° C. Then, the flue gas was subjected to dust removal in an electrostatic precipitator and vented to the atmosphere through a stack. Percent dust removal was 99% or more, and percent $SO_x$ removal was 85–90%, which was not considerably lowered over a period of 3,000 hours.

According to the present process, nitrogen oxides and sulfur oxides can be efficiently removed from a coal combustion flue gas.

What is claimed is:

1. A process for treating flue gas containing sulfur oxides, comprising sulfur dioxide, and dust containing at least one metal oxide capable of forming a sulfate through reaction with sulfur trioxide, comprising:
   moving the flue gas through a catalyst reactor containing a shaped sulfur dioxide-oxidizing catalyst comprising at least 70% by weight on the basis of the total amount of the catalyst of titanium dioxide, and between 0.01–2% by weight of platinum, at a temperature of 350° to 500° C. and a space velocity of 200 to 100,000 $hr^{-1}$, thereby converting 87 to 99% of the sulfur dioxide to sulfur trioxide;
   allowing the sulfur trioxide to react with the metal oxides;
   absorbing the sulfur trioxide into the dust as a sulfate; and
   removing the dust.

2. A process for treating flue gas containing sulfur oxides, comprising sulfur dioxide, and dust containing at least one metal oxide capable of forming a sulfate through reaction with sulfur trioxide, comprising:
   moving the flue gas through a catalyst reactor containing a shaped sulfur dioxide-oxidizing catalyst comprising at least 70% by weight on the basis of the total amount of the catalyst of titanium dioxide, and between 0.01–2% by weight of an element selected from the group consisting of platinum, rhodium, ruthenium, and palladium, at a temperature of 400° to 500° C. and a space velocity of 200 to 100,000 $hr^{-1}$ thereby converting 88 to 99% of the sulfur dioxide to sulfur trioxide;
   allowing the sulfur trioxide to react with the metal oxides;
   absorbing the sulfur trioxide into the dust as a sulfate; and
   removing the dust.

3. A process for treating flue gas containing sulfur oxides, comprising sulfur dioxide, nitrogen oxide and dust, comprising:
   adding ammonia to the flue gas;
   contacting the flue gas with a nitrogen oxide-removing catalyst, thereby removing the nitrogen oxides by reduction by the ammonia;
   moving the flue gas resulting from the contacting steps through a catalyst reactor containing a shaped sulfur dioxide-oxidizing catalyst comprising at least 70% by weight on the basis of the total amount of the catalyst of titanium dioxide, and between 0.01–2% by weight of a platinum group element at a temperature of 300° to 450° C. and a space velocity of 1,000 to 50,000 $hr^{-1}$, thereby converting sulfur dioxide to sulfur trioxide;
   allowing the sulfur trioxide to react with components of the dust;
   absorbing the sulfur trioxide into the dust as a sulfate; and
   removing the dust.

4. A process according to claim 3, wherein the dust contains a metal oxide capable of forming sulfate through reaction with the sulfur trioxide.

5. A process according to claim 3, wherein the platinum group element is at least one of platinum, rhodium, ruthenium and palladium.

6. A process according to claims 2, 1, or 3, wherein the metal oxide consists of at least one of the oxides of alkali metals, alkaline earth metals, aluminum and iron.

7. A process according to claims 2, 1 and 3, wherein the catalyst also comprises at least one metal element of vanadium, chromium, manganese, iron, cobalt, nickel, copper, molybdenum, tungsten, tin, silver, lithium, sodium, potassium, rubidium, cesium, and francium, the amount of said at least one metal element being 0.01 to 30% by weight on the basis of the total amount of platinum.

* * * * *